United States Patent
Hayasaka

(10) Patent No.: US 10,019,134 B2
(45) Date of Patent: Jul. 10, 2018

(54) EDIT PROCESSING APPARATUS AND STORAGE MEDIUM

(71) Applicant: TEAC Corporation, Tokyo (JP)

(72) Inventor: Kaname Hayasaka, Saitama-ken (JP)

(73) Assignee: TEAC CORPORATION, Tokyo (JP)

( * ) Notice: Subject to any disclaimer, the term of this patent is extended or adjusted under 35 U.S.C. 154(b) by 986 days.

(21) Appl. No.: 14/322,645

(22) Filed: Jul. 2, 2014

(65) Prior Publication Data

US 2015/0012884 A1    Jan. 8, 2015

(30) Foreign Application Priority Data

Jul. 4, 2013    (JP) .................................. 2013-140336

(51) Int. Cl.
*G06F 3/048* (2013.01)
*G06F 3/0482* (2013.01)

(52) U.S. Cl.
CPC ................... *G06F 3/0482* (2013.01)

(58) Field of Classification Search
CPC .................................................. G06F 3/0482
USPC ......................................................... 715/811
See application file for complete search history.

(56) References Cited

U.S. PATENT DOCUMENTS

| 6,160,539 | A | 12/2000 | Fleck |  |
|---|---|---|---|---|
| 6,473,073 | B1 | 10/2002 | Fleck |  |
| 6,689,965 | B1* | 2/2004 | Fleck | G06F 3/04812 |
|  |  |  |  | 178/18.01 |
| 7,793,211 | B2* | 9/2010 | Brenner | G06Q 30/02 |
|  |  |  |  | 705/14.4 |
| 7,882,449 | B2* | 2/2011 | Lacock | G06F 3/0482 |
|  |  |  |  | 715/765 |
| 2010/0005069 | A1* | 1/2010 | Wang | G06F 17/30867 |
|  |  |  |  | 707/E17.108 |
| 2012/0206391 | A1 | 8/2012 | Kim et al. |  |
| 2012/0208466 | A1 | 8/2012 | Park et al. |  |
| 2012/0208514 | A1 | 8/2012 | Park et al. |  |
| 2012/0209878 | A1 | 8/2012 | Park et al. |  |
| 2012/0210275 | A1 | 8/2012 | Park et al. |  |
| 2012/0229493 | A1 | 9/2012 | Kim et al. |  |
| 2012/0299942 | A1* | 11/2012 | Braun | H04N 1/46 |
|  |  |  |  | 345/589 |

(Continued)

FOREIGN PATENT DOCUMENTS

| CN | 1239253 A | 12/1999 |
|---|---|---|
| CN | 1243283 A | 2/2000 |
| CN | 1838053 A | 9/2006 |

(Continued)

OTHER PUBLICATIONS

Japanese Office Action, dated Mar. 14, 2017, 6 pages. [With English Translation].

*Primary Examiner* — Jeffrey A Gaffin
*Assistant Examiner* — Mohamed Abou El Seoud
(74) *Attorney, Agent, or Firm* — Seed Intellectual Property Law Group LLP

(57) ABSTRACT

An edit processing apparatus for enhancing user operability. The edit processing apparatus has an output device for displaying a target to be edited; and a CPU that displays on the output device edit menus for the target in accordance with a relative positional relationship between a position of the target and a cursor position on the output device and a frequency of selection made at the cursor position in the past.

17 Claims, 7 Drawing Sheets

(56) References Cited

U.S. PATENT DOCUMENTS

2014/0015784 A1  1/2014  Oonishi
2014/0071063 A1* 3/2014  Kuscher .................. G06F 3/041
                                                    345/173

FOREIGN PATENT DOCUMENTS

| | | |
|---|---|---|
| CN | 102695097 A | 9/2012 |
| CN | 103092471 A | 5/2013 |
| JP | 60181790 A | 9/1985 |
| JP | 63-118820 A | 5/1988 |
| JP | 01182881 A | 7/1989 |
| JP | 02216193 A | 8/1990 |
| JP | 5-173750 A | 7/1993 |
| JP | 0916314 A | 1/1997 |
| JP | 9-81322 A | 3/1997 |
| JP | 09274627 A | 10/1997 |
| JP | 10-222340 A | 8/1998 |
| JP | 11-509694 A | 8/1999 |
| JP | 2011-107823 A | 6/2001 |
| JP | 2002-297187 A | 10/2002 |
| JP | 2004-62904 A | 2/2004 |
| KR | 10-2011-0013766 A | 2/2011 |
| KR | 10-2012-0103075 A | 9/2012 |
| WO | 96/31979 A1 | 10/1996 |
| WO | 99/66394 A1 | 12/1999 |
| WO | 2012/128361 A1 | 9/2012 |

\* cited by examiner

EDIT PROCESSING APPARATUS AND STORAGE MEDIUM

PRIORITY INFORMATION

This application claims priority to Japanese Patent Application No. 2013-140336, filed on Jul. 4, 2013, which is incorporated herein by reference in its entirety.

BACKGROUND OF THE INVENTION

Technical Field

The present invention relates to an edit processing apparatus and a storage medium and, more particularly, to a technique for displaying edit menus.

Background Art

Known capabilities make it possible for users to select any of function keys arranged in a computer keyboard or on an application screen and to thereby perform operation corresponding to the thus-selected function with a mouse cursor.

Described in JP 60-181790 A is a technique for displaying a cursor whose shape is selected on the basis of information about coordinates on a display.

Described in JP 1-182881 A is displaying a cursor pattern that is selected according to preset pattern switching conditions.

Described in JP 2-216193 A is a cursor whose shape changes when moved onto a window frame.

Described in JP 9-016314 A is an edit function that is switched by changing display details (a color and a shape) of a mouse cursor.

Described in JP 9-274627 A is a mouse cursor whose shape changes in conformance with each processing mode when the mouse cursor is brought closer to surrounding areas of a work line or a mark displayed in a display section.

Under the techniques, edit functions are switched by changing the shape of the cursor or mouse cursor. However, a cursor switching point is not necessarily clear, and searching coordinates for performing intended operation involves much effort. Further, even when the cursor shape has changed in agreement with intended operation, unintended operation might be performed if the cursor is moved unintentionally before performance of the operation.

SUMMARY

The present invention provides an edit processing apparatus for further enhancing user operability, as well as providing a storage medium for storing programs.

An edit processing apparatus of the present invention has display means for displaying a target to be edited; and control means for displaying edit menus for the target on the display means in accordance with a relative positional relationship between a position of the target and a position of user's operation on the display means and a frequency of selection made at the position of user's operation in the past.

In one embodiment of the present invention, the control means displays the edit menus such that the edit menus come to higher positions as the edit menus are selected with higher frequencies.

In another embodiment of the present invention, the control means displays the edit menus such that the edit menus are displayed in greater area with increasing frequencies of selection. Alternatively, the control means displays the edit menus in a highlighted manner with increasing frequencies of selection. Alternatively, the control means displays the edit menus closer to the position of operation with increasing frequencies of selection.

In still another embodiment of the present invention, the control means displays edit menus in list form.

In yet another embodiment of the present invention, the control means displays the edit menus in pop-up form. Further, the control means can also change a shape of a cursor in accordance with selection of the edit menu. Moreover, the control means can also automatically change the cursor shape in accordance with the relative positional relationship between the target position and the position of user's operation.

In another embodiment of the present invention, the position of user's operation is a cursor position or a touch position.

In still another embodiment of the present invention, the target is a sound signal waveform or image data. The image data include a photograph or a CG.

A computer readable storage medium of the present invention stores a program, wherein the program causes a computer processor to perform at least a step of displaying a target to be edited on a display device; a step of detecting a position of user's operation on the display device; and a step of reading from a memory a frequency of selection made at the position of operation in the past in accordance with a relative positional relationship between a position of the target and the position of user's operation and displaying on the display means edit menus for the target according to the frequency of selection.

According to the present invention, a desired edit menu for a target to be edited can be easily selected and performed.

The present invention will be more clearly comprehended by reference to the embodiments provided below. However, the embodiments provided below are illustrative, and the scope of the invention is not limited to the embodiments.

BRIEF DESCRIPTION OF THE DRAWINGS

Preferred embodiments of the present invention will be described in detail by reference to the following drawings, wherein.

DETAILED DESCRIPTION OF THE PREFERRED EMBODIMENTS

Embodiments of the present invention are hereunder described by reference to the drawings.

Figure 1:
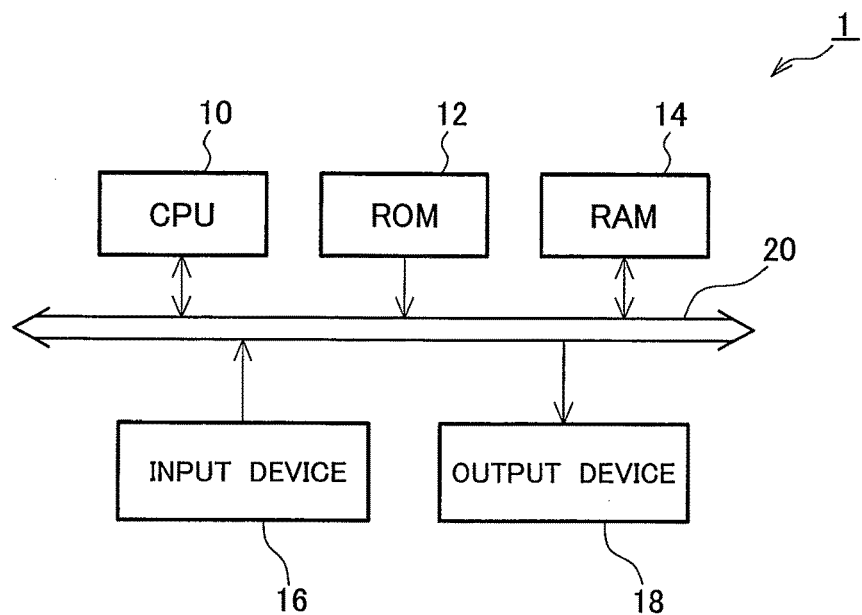
FIG. 1 is a block diagram of a configuration of an embodiment.

FIG. 1 shows a functional block diagram of an edit processing apparatus of an embodiment. An edit processing apparatus 1 has a CPU 10, ROM 12, RAM 14, an input device 16, an output device 18, and a bus 20.

The CPU 10 reads an edit processing program stored in the ROM 12 and performs predetermined processing. Predetermined processing include:

processing for displaying on the output device 18 various objects as targets to be edited;

processing for displaying a cursor;

processing for detecting a cursor position as a position of user's operation;

processing for displaying edit menus in accordance with the detected cursor position;

processing for performing a function assigned to the selected edit menu; and processing for changing, on the basis of learned data, the edit menus to be displayed in accordance with the detected cursor position.

The ROM 12 stores an edit processing program. The edit processing program can also be downloaded from a server computer or a cloud computer by way of the Internet, and the like, and stored in the ROM 12. The RAM 14, as working memory, stores data necessary for edit processing. Data to be stored in the RAM 14 include learned data; specifically, a history of edit menus selected by the user. The ROM 12 is made up of semiconductor memory, like flash memory. The edit processing program can also be stored in a magnetic disc, such as a hard disc drive, or an optical disc.

The input device 16 is made up of a mouse, a mouse pad, a pen, a touch panel, and others, and the user inputs operations by way of the input device 16.

The output device 18 is made up of a liquid crystal display, an organic EL display, or the like, and displays various targets to be edited by the edit processing program.

The CPU 10 reads an edit processing program from the ROM 12, displays a target to be edited on the output device 18 in accordance with the edit processing program, and edits the target in response to user operation input by way of the input device 16. A word "edit processing" includes:

document editing implemented by a document creation application;

graphics editing implemented by a graphics drawing application;

photo editing implemented by a photo application; and sound waveform editing implemented by a music application;

A target to be subjected to document creation of the document creation application is a document. A target to be subjected to graphics editing of the graphics drawing application is a picture. A target to be subjected to photo editing of the photo application is a photograph. A target to be subjected to sound waveform editing of the music application is a sound signal waveform.

The CPU 10 displays the target, such as a document, a photograph, a sound signal waveform, and the like, on the output device 18, as well as displaying in list form edit menus to be performed for the target during editing operation according to a relative positional relationship between a cursor position and the target. On this occasion, the CPU 10 stores edit menus selected by the user at this location in the past, thus learning choices. According to the history of past choices, the CPU 10 displays edit menus in list form. For instance, edit menus are displayed in list form such that edit menus selected with higher frequencies come to higher positions.

Processing of the CPU 10 of the embodiment is summarized as follows:

(1) displaying a target to be edited on the output device 18;

(2) detecting a cursor position as a position of user's operation.

(3) displaying edit menus in list form in accordance with a relative positional relationship between the target position and the cursor position; and (4) displaying a list in accordance with learned data at the relative position. For instance, the edit menus are displayed in list form such that edit menus selected with higher frequencies come to higher positions.

The relative positional relationship between the target position and the cursor position means the cursor position taking into account the target position rather than a single cursor position. Specifically, the relative positional relationship encompasses; for instance, an overlap existing between the cursor position and the target position; the cursor position situated in the vicinity of the target position; and the cursor position spaced apart from the target position. Since a displayed position of the target is known, the CPU 10 can easily recognize the relative positional relationship between the cursor position and the target position by detecting the cursor position. Whether or not the cursor position is in the vicinity of the target position can be determined by means of a determination as to whether or not a distance between the cursor position and the target position is in excess of a predetermined threshold value.

When learned data are not present in the relative position; namely, when the user has not yet selected a specific edit menu at the relative position, the CPU 10 displays edit menus in list form in a default sequence preliminarily set by the edit processing program. When displaying the edit menus, the CPU 10 can also provide the display such that the user can visually identify whether or not the edit menus are displayed in a default sequence.

The configuration shown in FIG. 1 is an exemplification of a common configuration of a computer. The configuration of the edit processing apparatus is not limited to that shown in FIG. 1. Accordingly, the edit processing apparatus can also include a plurality of processors or a memory controller and a variety of input/output interfaces.

Figure 2:
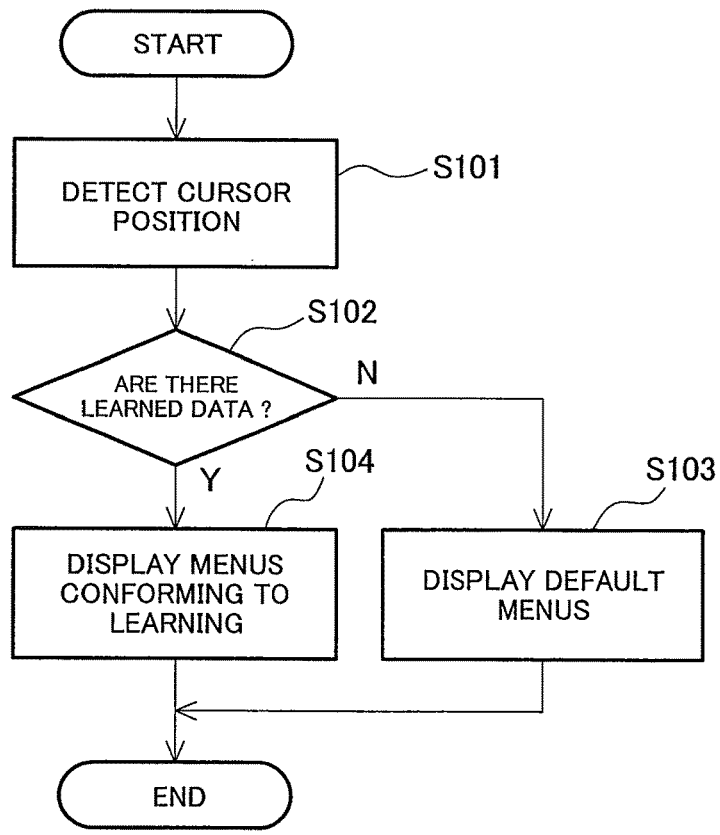
FIG. 2 is a processing flowchart of the embodiment.

FIG. 2 is a processing flowchart of the embodiment. After displaying the target on the output device 18, the CPU 10 detects the position of the cursor, like a mouse, manipulated by the user (S101). The cursor position is detected as two-dimensional orthogonal coordinates X and Y in a display area of the output device 18. Next, the CPU 10 determines whether or not learned data are present in the detected cursor position; in other words, whether or not the history of choices of a specific menu made by the user in the past, is stored in the RAM 14 (S102). When learning data are not yet present in that position (NO in S102), the CPU 10 displays default menus previously set according to the position; namely, the relative position with respect to the target (S103). Settings are made, for instance, such that, when the cursor position is situated at a location where it overlaps with the target and when COPY, PASTE, and CUT are present as edit menus, the menus are displayed by default in this sequence.

In the meantime, when learned data are present at that position (YES in S102), the CPU 10 displays menus according to the learned data at that position (S104). For instance, when the cursor position is situated at a location where it overlaps with the target, the CPU 10 displays, at that location, menus such that CUT is positioned on the top if the history of CUT selected by the user in the past is stored in the RAM 14.

As above, the menu display is changed in accordance with learning when the edit menus are displayed according to the cursor position, whereby the user can easily select a desired menu even when performing operation analogous to that performed in the past.

When the user has selected any one of the displayed edit menus, the CPU 10 executes processing pertinent to the selected edit menu and performs learning by newly, additionally storing the history of choices of the edit menu in the RAM 14. When the user likewise moves the cursor position so as to overlap the target next time, the edit menus will be displayed while reflecting the learning data. Since the edit menu selected in the past is displayed at the top of the list, the user can easily select and perform the edit menu even when performing edit processing similar to that performed before. Since the edit menu used in the past is displayed at the top and selected, all the user has to do is to simply perform manipulation (a single click) for setting the edit menu with the mouse.

When learned data are determined to be present in S102 and when a plurality of sets of learned data are present, edit menus are displayed in list form in a sequence conforming to frequencies with which the edit menus were selected in the past. Specifically, when there are edit menus "a," "b," and "c" and when they were selected the following numbers of times in the past a: 0 time
b: 1 time
c: 3 times
d: 2 times, the edit menu "c" is displayed at the top, and the others "d," "b," and "a" are displayed in this sequence.

Figure 3:
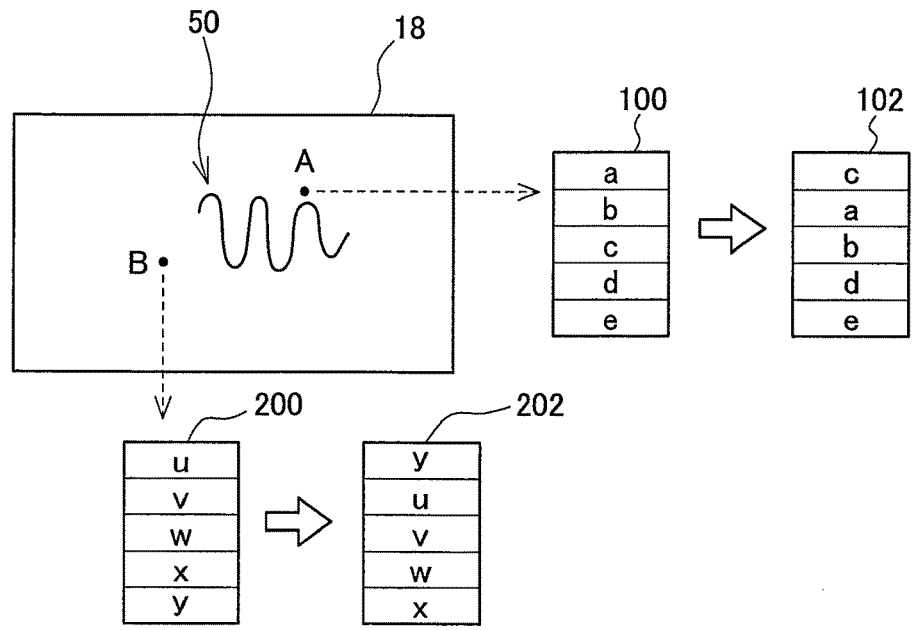
FIG. 3 is a diagrammatic explanatory view (Part 1) of the embodiment.

FIG. 3 schematically shows processing of the embodiment. The CPU 10 is presumed to display on the output device 18 a target 50 to be edited. The drawing illustrates a waveform of a sound signal as the target 50, but the waveform is an exemplification. The target shall not be limited to the sound signal waveform.

When the user moves the cursor to location A in the drawing by manipulating the mouse serving as the input device 16, the CPU 10 detects the location A of the cursor, displaying an edit menu corresponding to the location A. The location A is one that exhibits a relative positional relationship with respect to the target 50. When learned data are not yet present at the location A, the CPU 10 displays in list form Edit Menu "a,"
Edit Menu "b,"
Edit Menu "c,"
Edit Menu "d," and
Edit Menu "e"

in this sequence as a default menu 100.

When learned data are present at the location A and when the Edit Menu "c" was selected by the user in the past, the CPU 10 changes the display of the edit menus in accordance with the learned data stored in the RAM 14, displaying as a post-learning menu 102

Edit Menu "c,"
Edit Menu "a,"
Edit Menu "b,"
Edit Menu "d," and
Edit Menu "e"

in this sequence.

Specifically, edit menus are displayed in list form in a descending sequence of frequency from the highest frequency. If the edit menus have the same frequency, the edit menus will be displayed in a default sequence. The edit menu having no historical record of being selected in the past can also be deleted from the list. For instance, when the Edit Menu "e" has never been selected in the past and when the others have been selected, the Edit Menu "e" is not displayed in the list.

Edit Menu "c,"
Edit Menu "a,"
Edit Menu "b," and
Edit Menu "d."

Alternatively, the Edit Menu "e" having no historical record of being selected in the past can also be displayed at low contrast rather than being deleted from the list. Visibility for selection is thereby enhanced to a much greater extent.

On the other hand, when the cursor is moved to location B, which differs from the location A, in the drawing by manipulation, the CPU 10 detects the location B of the cursor, displaying edit menus corresponding to the location. The location B is one which is distant from the target 50. When learned data are not yet present at the location B, the CPU 10 displays as a default menu 200

Edit Menu "u,"
Edit Menu "v,"
Edit Menu "w,"
Edit Menu "x," and
Edit Menu "y"

in this sequence.

Since the relative positional relationship between the location A and the target 50 differs from the relative positional relationship between the location B and the target 50, their default menus naturally differ from each other. Since the edit menus "a," "b," and "c" corresponding to the location A are invalid at the location B, the menus are not displayed. Conversely, since the edit menus "u," "v," and "w" corresponding to the location B are invalid at the location A, they are not displayed at the location A. This thereby makes the user easy to select edit menus at each of the locations A and B.

When learned data are present at the location B and when the edit menu "y" was selected by the user in the past, the CPU 10 changes the display of the edit menus in accordance with the learned data stored in the RAM 10, displaying as a post-learning menu 202

Edit Menu "y,"
Edit Menu "u,"
Edit Menu "v,"
Edit Menu "w," and
Edit Menu "x"

in this sequence.

Specifically, edit menus are displayed in list form in a descending sequence of frequency from the highest frequency. If edit menus have the same frequency, the edit menus will be displayed in a default sequence.

In FIG. 3, heed should be paid to the fact that the default edit menu 100 appearing at the location A and the default edit menu 200 appearing at the location B differ from each other and that each of the edit menus is changed by learned data.

Figure 4:
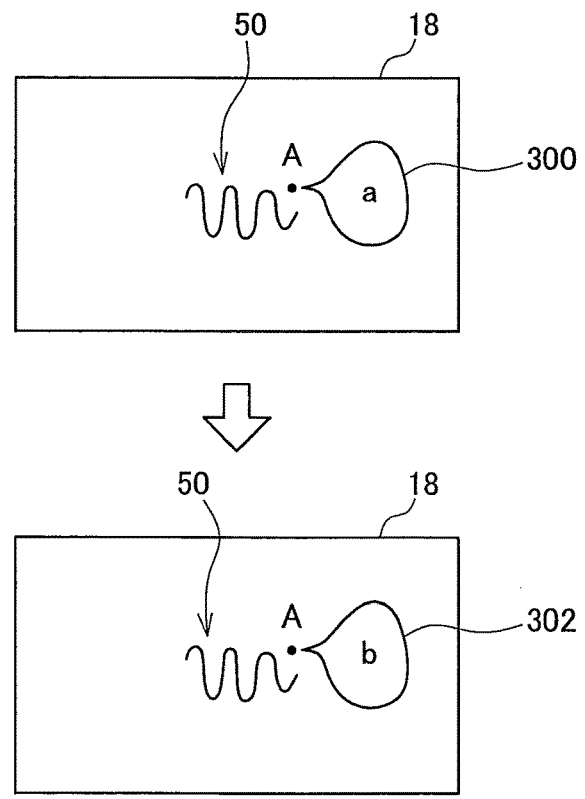
FIG. 4 is a diagrammatic explanatory view (Part 2) of the embodiment.

FIG. 4 schematically illustrates another processing of the embodiment. In processing shown in FIG. 3, the edit menus are illustrated in the form of a list, but the edit menus are displayed in a pop-up manner in the example. When the CPU 10 detects the location A of the cursor while the target 50 is displayed on the output device 18, edit menus pop up in accordance with the location A: namely, the relative positional relationship between the target 50 and the location A. When learned data are not present at the location A, the CPU 10 displays only the edit menu "a" as a default menu in the form of a pop-up menu 300.

On the other hand, when learned data are present at the location A, the CPU 10 displays only the Edit Menu "b" as a pop-up menu 302. If the user desires selection of an edit menu other than the Edit Menu "b," all the user has to do is to command the CPU 10 to display another edit menu by clicking a right mouse button. In response to the operation, the CPU 10 displays another edit menu in place of the display of the pop-up menu 302. When the user has selected an edit menu other than the Edit Menu "b," the CPU 10 stores selection and execution of the edit menu in the RAM 14, thereby learning the choice.

Learned data are stored for each relative positional relationship with respect to the target 50 and each of the edit menus included in the default edit menu at each position. For instance, provided that the location A shown in FIG. 3 is one on the target 50 and that the location B is one spaced apart from the target 50, the history of past choices is counted for each of the Edit Menus "a" to "e" at the location on the target 50, and the counts are stored in the RAM 14. The history of past choices is counted for each of the Edit Menus "u" to "y" at the location spaced apart from the target 50, and the counts are stored in the RAM 14. Namely, learned data are stored in the RAM 14 as a two-dimensional map for each relative location with respect to the target and each edit menu.

Edit processing of the embodiment is now described specifically by means of taking, as examples, edition of a sound signal waveform and edition of a photograph.

Figure 5:
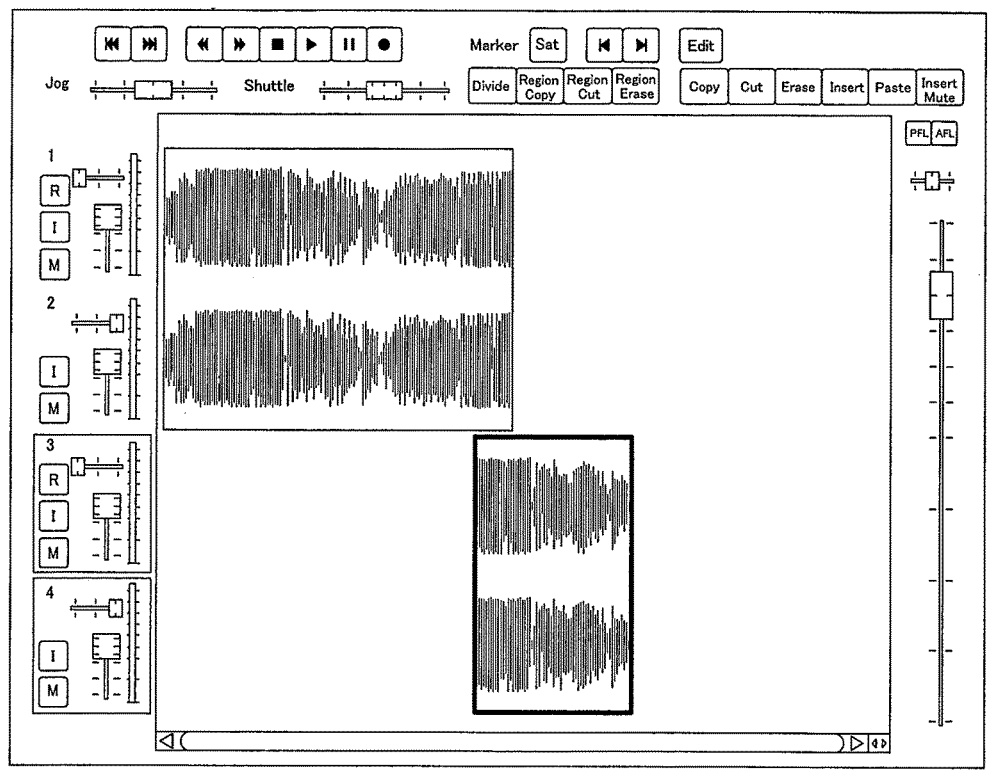
FIG. 5 is an explanatory view (Part 1) of edition of a sound signal waveform.

FIG. 5 shows an example screen on which a sound signal waveform is to be edited. A liquid crystal display serving as the output device 18 shows sound signal waveforms equivalent of a total of four channels; that is, a first channel, a second channel, a third channel, and a fourth channel. When editing the sound signal waveforms of the third and fourth channels, the user first selects the sound signal waveform of the third channel and the sound signal waveform of the fourth channel by manipulating the mouse serving as the input device 16. FIG. 5 shows that the sound signal waveform of the third channel and the sound signal waveform of the fourth channel are enclosed with a frame and selected.

The user next moves the cursor onto the selected sound signal waveform of the third channel and the selected sound signal waveform of the fourth channel by manipulating the mouse. Thereupon, the CPU 10 detects the position of the cursor and determines that the cursor is situated on the sound signal waveforms, displaying a menu for editing a sound signal waveform.

Figure 6:
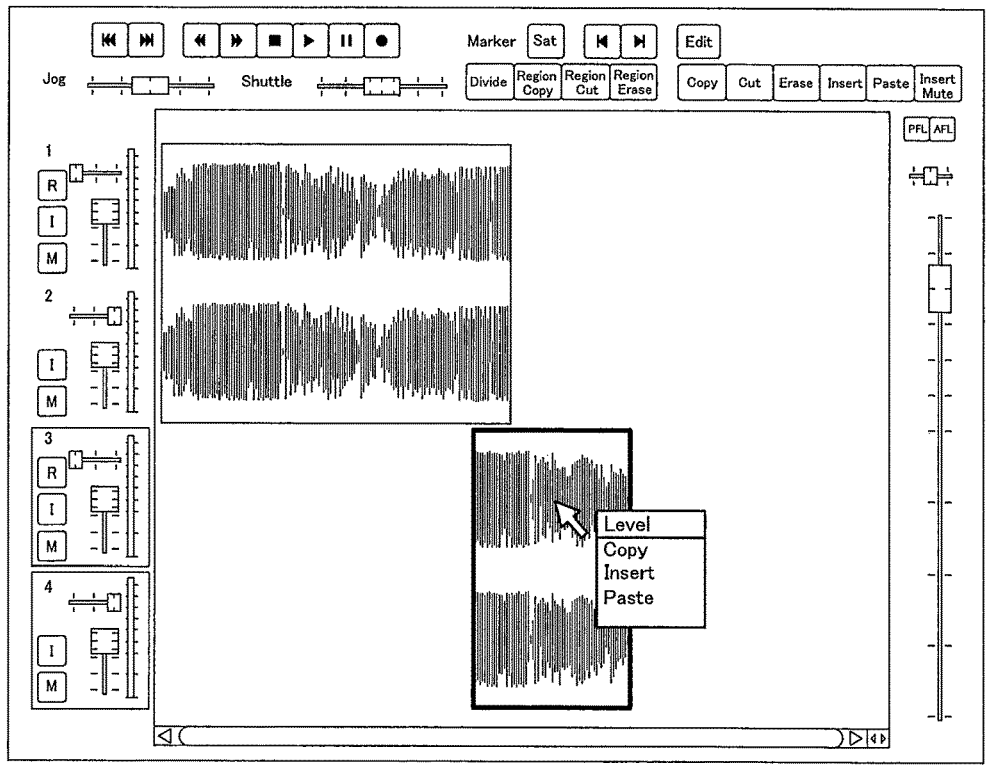
FIG. 6 is an explanatory view (Part 2) of edition of the sound signal waveform.

FIG. 6 shows that edit menus are displayed. LEVEL (Level), COPY (Copy), INSERT (Insert), and PASTE (Paste) are displayed as edit menus, and LEVEL is displayed at the top as a learning outcome. Although COPY is displayed at the top as default edit menu, LEVEL is displayed at the top rather than COPY as a result of the user having selected and executed LEVEL in the past at this location; namely, when the cursor is situated on the sound signal waveforms. In addition to this, CUT (Cut), ERASE (Erase), TRIM (Trim), MOVE (Move), FADE (Fade), and the like, are also probable as edit menus for a sound signal waveform. If the user selected FADE a number of times in the past, FADE is displayed at the top instead of LEVEL. When LEVEL and FADE were selected the same number of times, either of the two is displayed at the top pursuant to default ranks (if LEVEL is ranked higher by default, LEVEL will be displayed at the top).

In FIG. 6, when the edit menus are displayed, a displayed state is maintained except when the user cancels the edit menus by manipulating the mouse or when the cursor can be recognized as being spaced a given distance or more from and clearly as having moved away from the sound signal waveform. Consequently, even if the user has moved the cursor unintentionally before selecting and executing a desired edit menu, unintended operation will not be performed.

Figure 7:
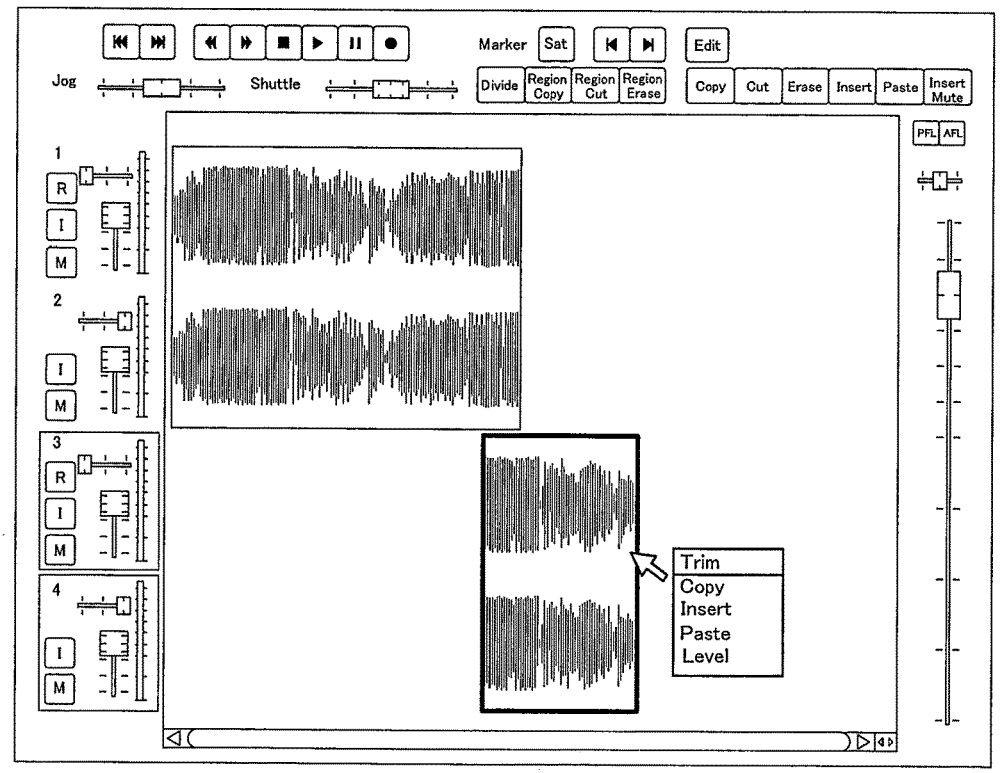
FIG. 7 is an explanatory view (Part 3) of edition of the sound signal waveform.

FIG. 7 shows an example display of the edit menus when the user has moved the cursor close to an end of the sound signal waveform by manipulating the mouse. TRIM, COPY, INSERT, PASTE, and LEVEL are displayed as edit menus, and TRIM is displayed at the top as a learning outcome. This is a consequence conforming to actual operation; namely, performing trimming rather than copying or a level change, at the end of the waveform.

Figure 8:
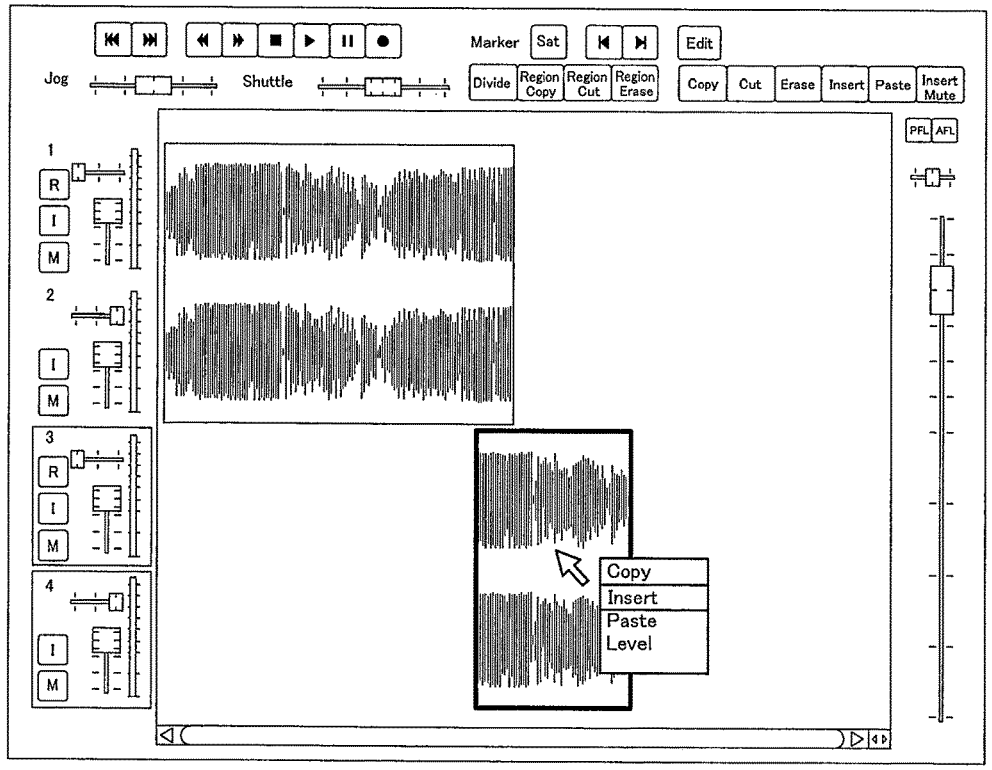
FIG. 8 is an explanatory view (Part 4) of edition of the sound signal waveform.

FIG. 8 shows an example display of edit menus appearing when the user has moved the cursor to a location rather than on the sound signal waveform or the neighborhood of the end, by manipulating the mouse. COPY, INSERT, PASTE, and LEVEL are displayed as edit menus, and COPY is displayed at the top as a learning outcome. FIG. 8 also shows that the user is selecting INSERT displayed on the second position by rotating a wheel of the mouse rather than COPY displayed at the top. When the user selects and executes INSERT, data pertinent to selection and execution of INSERT are stored as learned data in the RAM 14. Depending on a learning outcome, when the user moves the cursor to this position, INSERT is displayed at the top.

Figure 9:
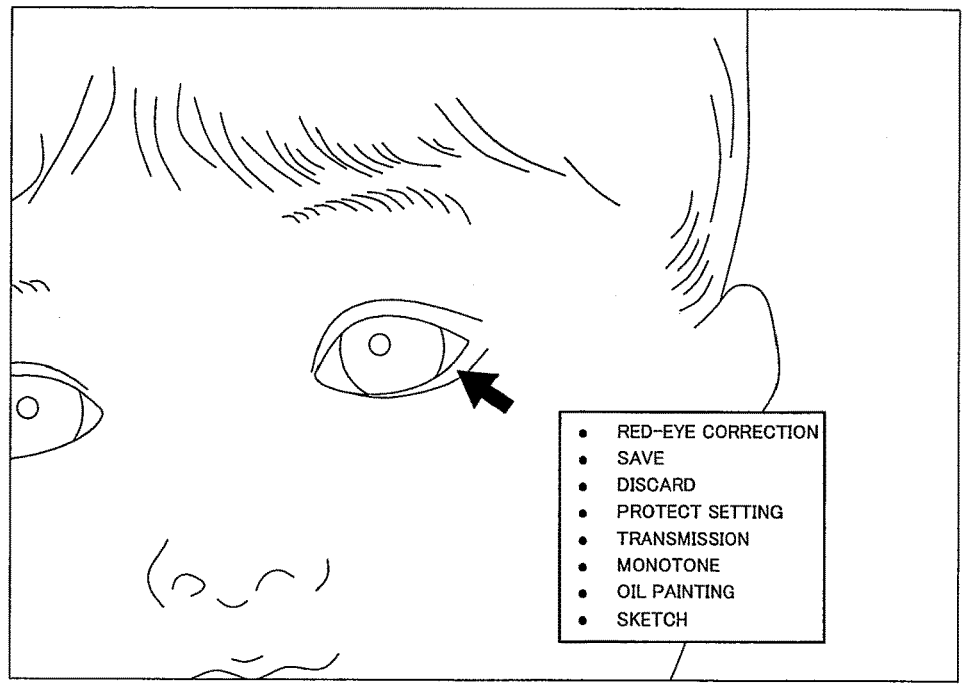
FIG. 9 is an explanatory view (Part 1) of edition of a photograph.

FIG. 9 shows an example screen for editing image data; for instance, a photograph. A photograph is displayed on the liquid crystal display serving as the output device 18. When the user moves the cursor to a location on an eye of a person in the photograph by manipulating the mouse, the CPU 10 detects the cursor position, displaying edit menus corresponding to the location. RED-EYE CORRECTION, SAVE, DISCARD, PROTECT SETTING, TRANSMISSION, MONOTONE, OIL PAINTING, and SKETCH are displayed as edit menus. RED-EYE CORRECTION is displayed at the top as a learning outcome.

Figure 10:
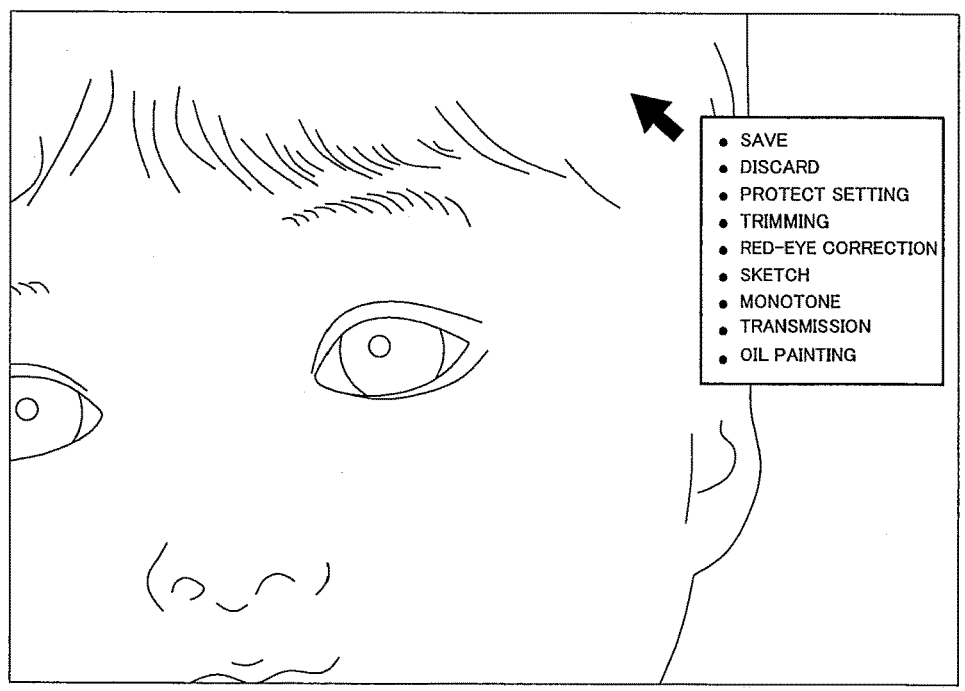
FIG. 10 is an explanatory view (Part 2) of edition of the photograph.

In FIG. 10, when the user moves the cursor to a location other than the eye of the person in the photograph by manipulating the mouse, the CPU 10 detects the location of the cursor, displaying edit menus corresponding to the location. SAVE, DISCARD, PROTECT SETTING, TRIMMING, RED-EYE CORRECTION, SKETCH, MONOTONE, TRANSMISSION, and OIL PAINTING are displayed as edit menus, and SAVE is displayed at the top as a learning outcome. CG can also be used as image data in place of a photograph. In addition, the image data do not need to be two-dimensional data but can also be three-dimensional data.

As mentioned above, the edit menus corresponding to the target are displayed in accordance with the relative positional relationship between the cursor and the target, and the display sequence is changed according to the past choices and the frequency of execution, whereby user operability is enhanced.

Although the embodiment of the invention has been described above, the present invention is not limited to the embodiment and susceptible to various modifications.

For instance, in the embodiment, the cursor position is used as the position of user operation, and the edit menus are displayed in accordance with the cursor position. However, in the case of a touch panel, such as a tablet terminal of the input device 16, a position of a user's touch can be used as the position of user's operation in place of the cursor position. Upon detecting a case where the position of the user's touch continually stays at a specific location for a predetermined period of time or performance of tapping, the CPU 10 displays in list form edit menus corresponding to the location. The edit menus are displayed in sequence conforming to the past choices and the frequency of execution. When the user releases his/her finger, the top edit menu is selected and performed. By slipping his/her finger downward from the location, the user can select an arbitrary menu from the edit menus displayed in list form. Alternatively, a user's line of sight can also be detected as the position of user's operation. The edit menus for the target change according to the relative positional relationship between the target position and the position at which the user is gazing as well as the frequency of selection made in the past.

In addition to the tablet terminal, the present invention can also be applied to a digital camera, a smartphone, or a wearable terminal which is operated by a touch.

In the embodiment, the learned data are stored in the RAM 14 but can also be stored in a nonvolatile recording medium, like the ROM 2. Alternatively, when being stored, the learned data can also be stored along with user's personal identification data. Specifically, the learned data are stored on a per-user basis, and the display of the edit menus can be changed on per-user basis. This configuration is preferable when a plurality of users utilize the same edit processing apparatus.

In the embodiment, a function of the cursor is exhibited by displaying the edit menus. However, it is also possible to preliminarily prepare different icons for respective edit menus and change a shape of the cursor into an icon corresponding to a selected edit menu. When the icon change function is set, a selected edit menu can be identified from the shape of the displayed icon. Hence, the edit menus displayed in list or pop-up form can also be hidden after elapse of a given time. In this case, in order to let the edit menus show up again, all you need to do is to command a display by manipulating the input device 16 (for instance, clicking the right mouse button).

Figure 11:
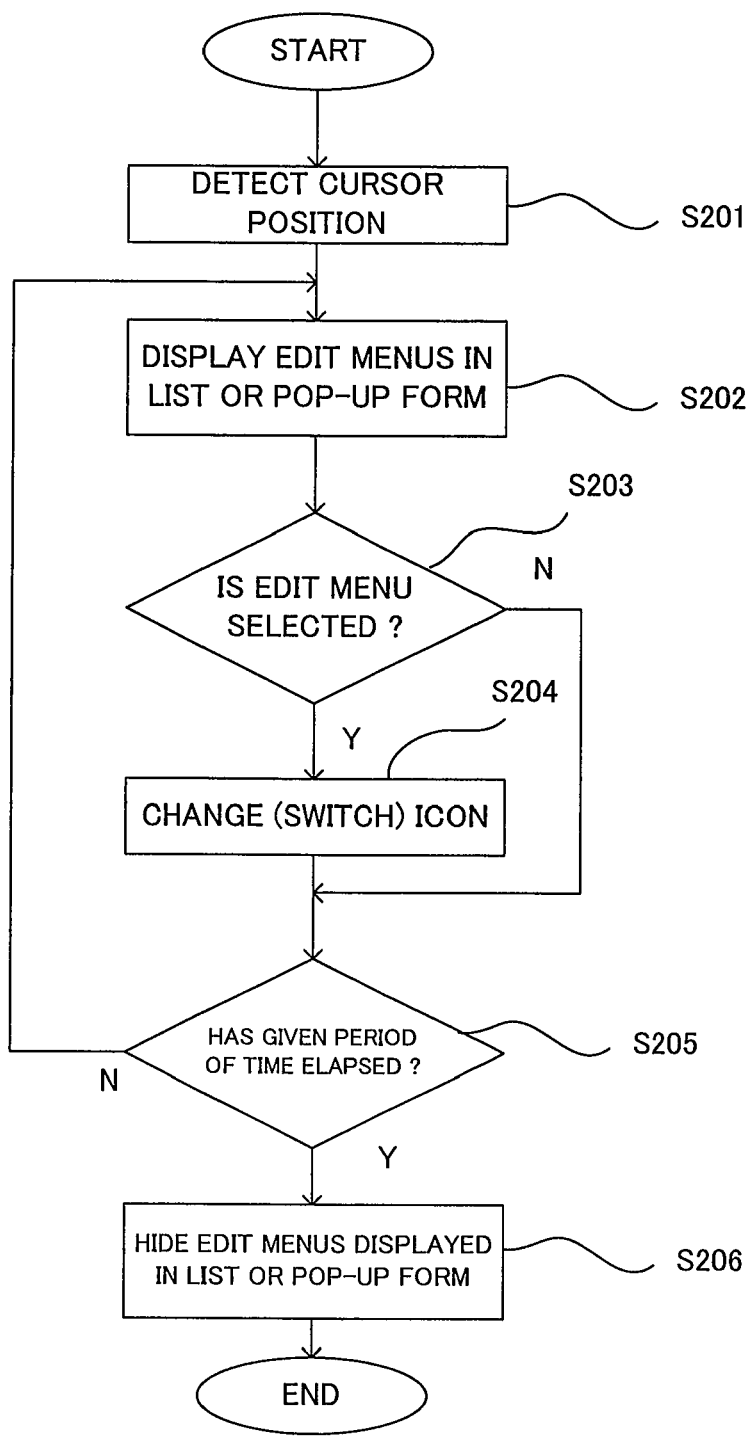
FIG. 11 is a processing flowchart of another embodiment.

FIG. 11 shows a processing flowchart for this case. First, the CPU 10 detects the cursor position (S201). Edit menus are displayed in list or pop-up form according to the cursor position (S202). A determination is then made as to whether or not the user has selected any one in the edit menus (S203). When the edit menu has been selected, the cursor is displayed after the shape of the cursor is switched to an icon corresponding to the selected menu or the selected pop-up display (S204). On the contrary, when the user has not made any choice, the shape of the cursor stays intact. Subsequently, a determination is made as to whether or not a given period of time has elapsed (S205). When the given period of time has elapsed, the edit menus or the pop-up display provided in S202 is hidden (S206).

Further, the icon to be displayed can also be changed automatically according to the relative positional relationship between the target position and the cursor position. At this time, edit menus can also be displayed in list or pop-up form for a given period of time as explanations about functions of the displayed icon. Selection of an edit menu can also be made possible while the edit menus are displayed in list or pop-up form. In this case, it is desirable that the edit menus be continually displayed in list or pop-up form in the course of selecting operation being performed even after lapse of a given period of time.

Figure 12:
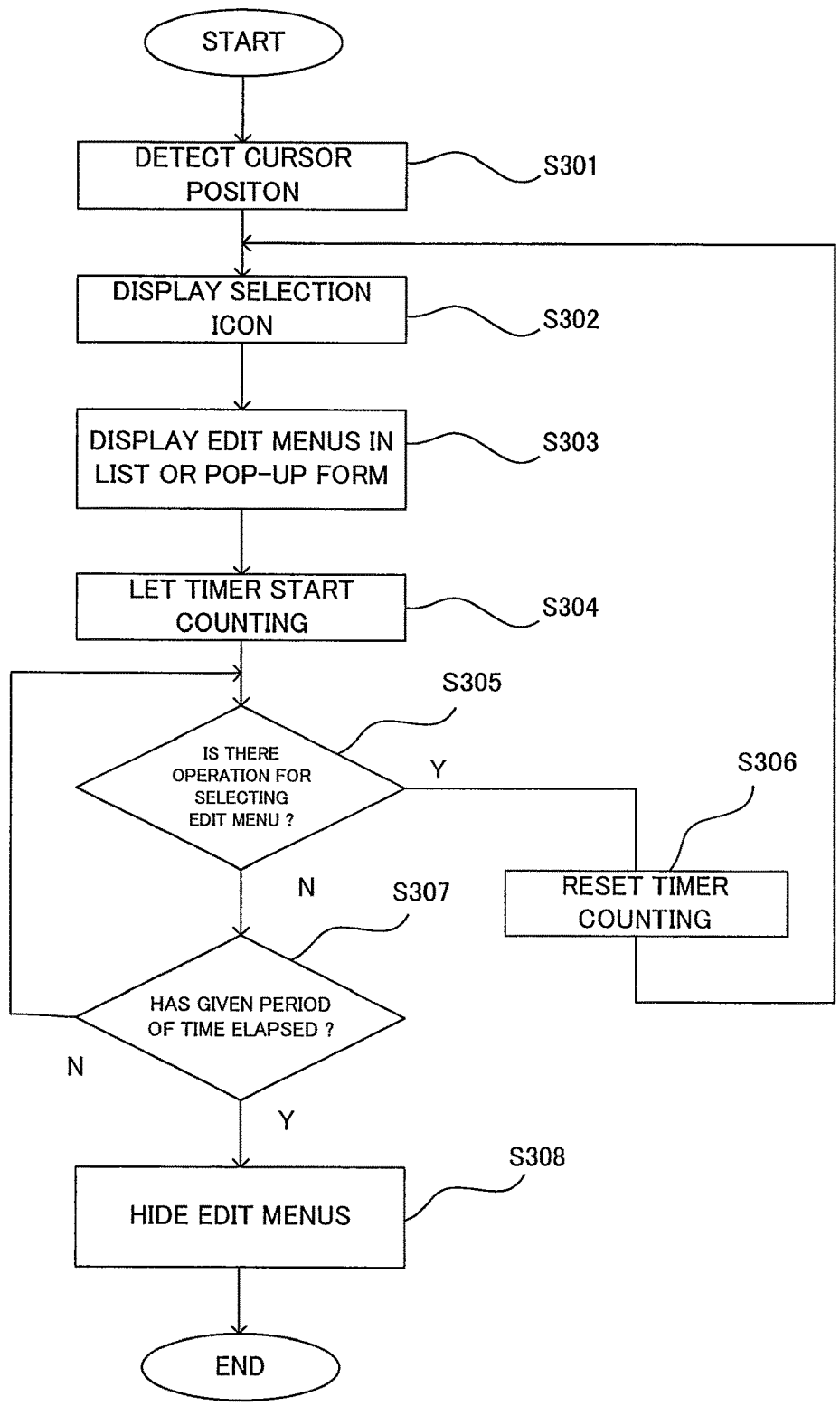
FIG. 12 is a processing flowchart of yet another embodiment.

FIG. 12 shows a processing flowchart for this case. The CPU 10 first detects a cursor position (S301). Next, a selection icon is displayed (S302), and edit menus are displayed in list or pop-up form (S303). A built-in timer is caused to start counting (S304), and it is determined if operation for selecting an edit menu is performed (S305). When the user has performed selecting operation, the counting operation of the timer is reset (S306), and processing subsequent to S302 is iterated. On the other hand, when the user has not yet performed selecting operation, it is additionally determined if a given period of time elapsed (S307). When a given period of time has not yet elapsed, processing returns to S305. Specifically, the edit menus are held displayed in list or pop-up form. Meanwhile, when a given period of time has elapsed, the edit menus displayed in list or pop-up form are hidden (S308).

In the embodiment, the edit menu selected with a higher frequency is displayed at a higher position in list form in accordance with learned data that are present at the relative position. Other alternatives are that the edit menus become greater in display area, highlighted, or displayed closer to the cursor position with increasing frequencies of selection.

What is claimed is:

1. An edit processing apparatus comprising:
a display device which, in operation, displays a target to be edited; and
a controller which, in operation:
detects a position of an input operation on the display device;
causes the display device to display edit menus for the target on the display device in accordance with a relative positional relationship between a position of the target to be edited that is displayed by the display device and the detected position of the input operation on the display device and a frequency of selection made at the position of the input operation in the past;
detects a selection of the edit menus displayed by the display device;
processes the target according to the detected selection of the edit menus displayed by the display device; and
displays the target as processed according to the detected selection of the edit menus displayed by the display device.

2. The edit processing apparatus according to claim 1, wherein the controller, in operation, causes the display device to display the edit menus such that the edit menus come to higher positions as the edit menus are selected with higher frequencies.

3. The edit processing apparatus according to claim 1, wherein the controller, in operation, causes the display device to display the edit menus such that, as the edit menus are displayed with higher frequencies, the edit menus are displayed in greater area, highlighted, or displayed closer to the operation position.

4. The edit processing apparatus according to claim 1, wherein the controller, in operation, causes the display device to change a shape of a cursor in accordance with a selection of the edit menu.

5. The edit processing apparatus according to claim 1, wherein the controller, in operation, causes the display device to change a shape of a cursor in accordance with the relative positional relationship between the position of the target and the position of the input operation.

6. The edit processing apparatus according to claim 1, wherein the controller, in operation, causes the display device to display the edit menus in list form.

7. The edit processing apparatus according to claim 1, wherein the controller, in operation, causes the display device to display the edit menus in pop-up form.

8. The edit processing apparatus according to claim 6, wherein the controller, in operation, causes the display device to hide the display of edit menus after elapse of a predetermined period of time.

9. The edit processing apparatus according to claim 7, wherein the controller, in operation, causes the display device to hide the display of edit menus after elapse of a predetermined period of time.

10. The edit processing apparatus according to claim 1, wherein the position of the input operation is a cursor position or a touch position.

11. The edit processing apparatus according to claim 1, wherein the target is a sound signal waveform or image data.

12. A non-transitory computer readable storage medium that stores a program which, when executed by a computer processor, causes the computer processor to:
   display a target to be edited on a display device;
   detect a position of an input operation on the display device; and
   read from a memory a frequency of selection made at the position of the input operation in the past in accordance with a relative positional relationship between a position of the target to be edited that is displayed by the display device and a position of the input operation;
   display on the display device edit menus for the target according to the frequency of selection in accordance with the relative positional relationship between the position of the target to be edited that is displayed by the display device and the position of the input operation;
   detect a selection of the edit menus displayed by the display device;
   process the target according to the detected selection of the edit menus displayed by the display device; and
   display the target as processed according to the detected selection of the edit menus displayed by the display device.

13. The storage medium according to claim 12, wherein the program, when executed by the computer processor, causes the computer processor to display the edit menus at higher positions with increasing frequencies of selection.

14. The storage medium according to claim 12, wherein the program, when executed by the computer processor, causes the computer processor to change a shape of a cursor in accordance with a selection of the edit menu.

15. The storage medium according to claim 12, wherein the program, when executed by the computer processor, causes the computer processor to automatically change a shape of a cursor in accordance with the relative positional relationship between the position of the target to be edited that is displayed by the display device and the position of the input operation.

16. The storage medium according to claim 12, wherein the position of the input operation is a cursor position or a touch position.

17. The storage medium according to claim 12, wherein the target is a sound signal waveform or image data.

* * * * *